(12) United States Patent
Gao et al.

(10) Patent No.: US 11,094,290 B2
(45) Date of Patent: Aug. 17, 2021

(54) SCREEN AND ELECTRONIC DEVICE (71) Applicant: BEIJING XIAOMI MOBILE SOFTWARE CO., LTD., Beijing (CN)

(72) Inventors: Jing Gao, Beijing (CN); Zhidong Yin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/740,443

(22) Filed: Jan. 12, 2020

(65) Prior Publication Data

US 2021/0097956 A1 Apr. 1, 2021

(30) Foreign Application Priority Data

Sep. 30, 2019 (CN) .......................... 201910945641.7

(51) Int. Cl.
  *G09G 5/10* (2006.01)
(52) U.S. Cl.
  CPC .......... *G09G 5/10* (2013.01); *G09G 2320/02* (2013.01); *G09G 2320/0626* (2013.01)
(58) Field of Classification Search
  CPC . G06F 3/005; G06F 3/01; G06F 3/013; G06F 3/0304; G06F 3/0487; G06F 3/14; G09G 3/20; G09G 5/00; G09G 2320/0686; G09G 2320/08; G09G 2360/144; G09G 3/2081; H04N 5/2351; H04N 5/2354; H04N 7/144
  See application file for complete search history.

(56) References Cited

U.S. PATENT DOCUMENTS

2013/0088630 A1* 4/2013 Kanade ................. H04N 7/144
  348/333.01
2016/0337570 A1* 11/2016 Tan .......................... G09G 5/00
2017/0084231 A1* 3/2017 Chew .................... G06F 1/1686

FOREIGN PATENT DOCUMENTS

CN 107610635 A 1/2018
CN 208386634 U 1/2019
CN 110232892 A 9/2019

OTHER PUBLICATIONS

Supplementary European Search Report in the European application No. 20151617.6, dated Jul. 10, 2020.

* cited by examiner

*Primary Examiner* — Nelson M Rosario
(74) *Attorney, Agent, or Firm* — Syncoda LLC; Feng Ma (57) ABSTRACT

A screen includes a main body display module and multiple auxiliary display units. By dividing a lighting functional coordination area of a main body display module into a lighting sub-area and a coordination sub-area out of the lighting sub-area, and arranging auxiliary display units in the coordination sub-area, the light transmission of the lighting sub-area is no longer interfered by the peripheral auxiliary display units, and thus the lighting effect is improved. In addition, the display effect of the auxiliary display units disposed in the coordination sub-area in a working state can be matched with a display content of a main display area, so that the influence of the lighting functional coordination area on the overall display effect of a screen is reduced.

8 Claims, 8 Drawing Sheets

SCREEN AND ELECTRONIC DEVICE

CROSS-REFERENCE TO RELATED APPLICATION

The present disclosure claims priority to Chinese Patent Application No. 201910945641.7 filed on Sep. 30, 2019, the disclosure of which is hereby incorporated by reference in its entirety.

SUMMARY

The present disclosure relates to the technical field of electronics, and more particularly, to a screen and an electronic device.

According to a first aspect of the present disclosure, a screen is provided, which includes a main body display module and auxiliary display units;

the main body display module includes a main display area and a lighting functional coordination area, and the lighting functional coordination area includes a lighting sub-area and a coordination sub-area disposed out of the lighting sub-area; and the auxiliary display units are disposed in the coordination sub-area, and a display effect of the auxiliary display units in a working state is matched with a display content of the main display area of the main body display module.

According to a second aspect of the present disclosure, an electronic device is provided, which includes a lighting functional module and the screen of the first aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the embodiments of the present disclosure. Instead, they are merely examples of apparatuses and methods consistent with aspects of the embodiments of the present disclosure as recited in the appended claims.

The terms used in the embodiments of the present disclosure are for the purpose of describing the specific embodiments only, and are not intended to limit the embodiments of the present disclosure. Unless otherwise defined, technical terms or scientific terms used in the embodiments of the present disclosure should be understood in the ordinary meaning of those of ordinary skill in the art to which the invention pertains. The words "first," "second" and similar terms used in the specification and claims of the present disclosure are not intended to indicate any order, quantity or importance, but only to distinguish different components. Similarly, the words "a" or "an" and the like do not denote a quantity limitation, but mean that there is at least one. "Multiple" or "several" means two or more than two. The similar words "including" or "comprising" and the like mean that elements or objects preceding "including" or "comprising" encompass elements or objects listed after "including" or "comprising" and their equivalents, and do not exclude other elements or objects. The similar words "connecting" or "connected" and the like are not limited to physical or mechanical connections, and may include electrical connections, whether direct or indirect. The singular forms "a," "the" and "this" used in the specification of the embodiments of the present disclosure and the appended claims are also intended to include a plurality of forms unless the context clearly indicates otherwise. It should also be understood that the term "and/or" as used herein refers to and encompasses any or all possible combinations of one or more of the associated listed items.

An electronic device like a mobile phone typically includes a front camera and other lighting functional modules to implement a corresponding front lighting function. However, due to a limited lighting mode of the front lighting functional module, the structural interference between the lighting functional module and a display area of a screen is caused, and thus the lighting effect of the lighting functional module and the overall display effect of a screen cannot be both guaranteed.

In an example that the lighting functional module is a front camera, a non-display area can be inevitably increased and thus a display proportion of the screen can be reduced by arranging the front camera of the electronic device in a non-display area of the screen. In a case that the front camera of the electronic device is disposed below a display area of the screen, the photographing function of the front camera can be interfered inevitably due to the light transmittance of the display area. However, in a case that a light hole corresponding to the front camera is provided in the display area of the screen, a display function cannot be implemented in the area with the light hole and thus the overall display effect of the screen may be degraded.

Figure 1:
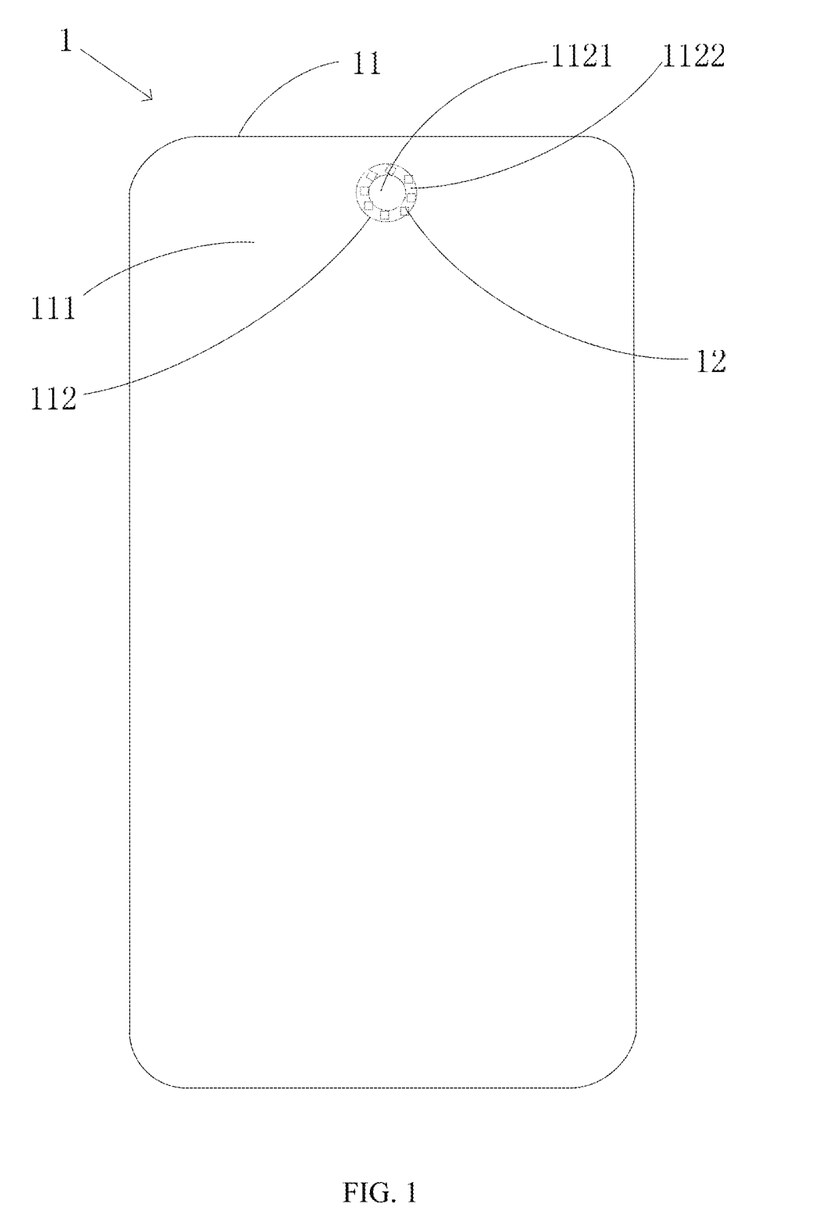
FIG. 1 is a structural schematic diagram of a screen according to some embodiments of the present disclosure.

FIG. 1 is a structural schematic diagram of a screen according to some embodiments of the present disclosure. As shown in FIG. 1, the screen 1 includes a main body display module 11 and multiple auxiliary display units 12. The main body display module 11 includes a main display area 111 and a lighting functional coordination area 112, and the lighting functional coordination area 112 includes a lighting sub-area 1121 and a coordination sub-area 1122 disposed out of the lighting sub-area 1121. The auxiliary display units 12 are disposed in the coordination sub-area 1122, and the display effect of the auxiliary display units 12 in a working state can be matched with a display content of the main display area 111 of the main body display module 11.

By dividing a lighting functional coordination area 112 of a main body display module 11 into a lighting sub-area 1121 and a coordination sub-area 1122 out of the lighting sub-area 1121, and arranging auxiliary display units 12 in the coordination sub-area 1122, the light transmission of the lighting sub-area 1121 can be no longer interfered by the peripheral auxiliary display units 12, and thus the lighting effect can be improved. In addition, the display effect of the auxiliary display units 12 disposed in the coordination sub-area 1122 in a working state can be matched with a display content of a main display area 111, so that the influence of the lighting functional coordination area 112 on the overall display effect of a screen 1 can be reduced. With the above structure, the lighting effect of the lighting functional module 21 and the overall display effect of the screen 1 can be improved.

In the above embodiment, the screen 1 can further include a display control circuit 13 electrically connected to the auxiliary display units 12, so as to control the auxiliary display units 12 to implement a display effect. The display control circuit 13 can be disposed in the coordination sub-area 1122 or in the main display area 111 or in the coordination sub-area 1122 and the main display area 111, so as to prevent the structural and functional interference to the lighting sub-area 1121 from the display control circuit 13 and from external light rays in the display control circuit 13.

Figure 2:
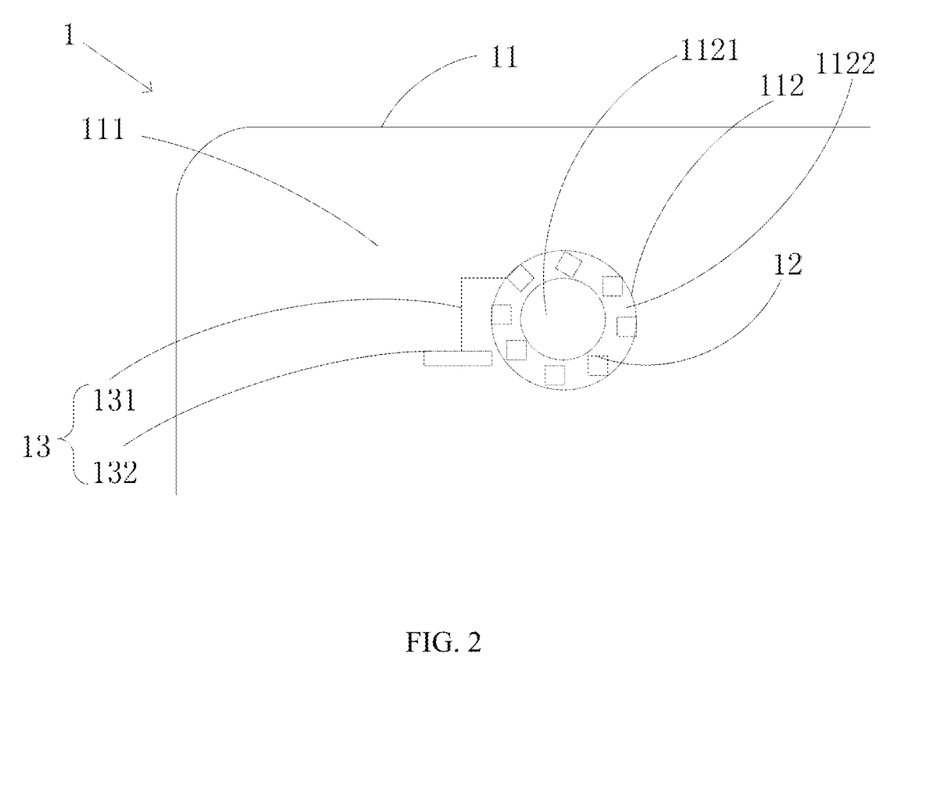
FIG. 2 is a schematic diagram of a locally-enlarged structure of a screen according to some embodiments of the present disclosure.

For example, as shown in FIG. 2, the display control circuit 13 can be disposed in the main display area 111. In such a case, the coordination sub-area 1122 may include the auxiliary display units 12 only, so that not only the interference from the display control circuit 13 to the lighting sub-area 1121 can be prevented, but also the flexibility of arrangement of the auxiliary display units 12 can be enhanced and the cooperative display effect between the auxiliary display units 12 and the main display area 111 can be improved.

Figure 3:
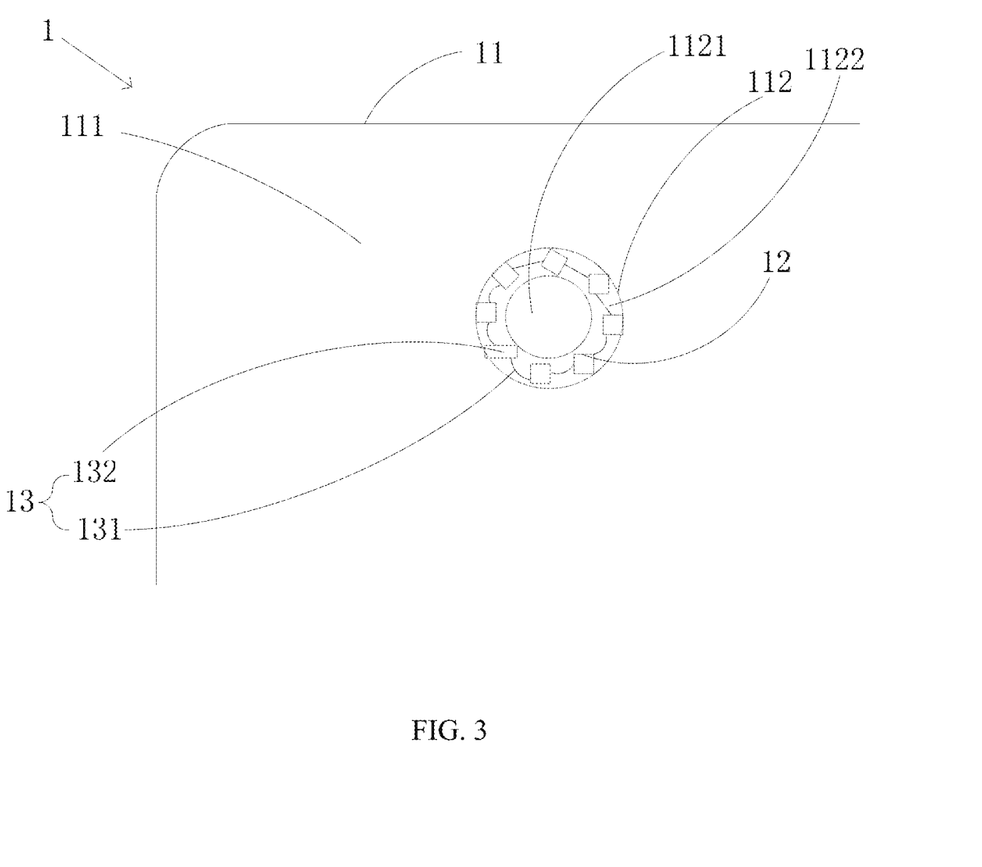
FIG. 3 is a schematic diagram of a locally-enlarged structure of a screen in another exemplary embodiment of the present disclosure.

In another example, as shown in FIG. 3, the display control circuit 13 can be disposed in the coordination sub-area 1122 to facilitate the electrical connection between the display control circuit 13 and the auxiliary display units 12. Alternatively, the display control circuit 13 may further be simultaneously disposed in the main display area 111 and the coordination sub-area 1122, so that the position for arranging the display control circuit 13 can be selected based on an assembly space between the main display area 111 and the coordination sub-area 1122 at a specified place, and both the flexibility of arranging the auxiliary display units 12 and the convenience of facilitating the electrical connection between the display control circuit 13 and the auxiliary display units 12 can be guaranteed.

It is to be noted that the display control circuit 13 can be a series circuit 131 connected to the multiple auxiliary display units 12, a drive component 132 for controlling the auxiliary display units 12, and the like, and is not limited by the present disclosure thereto.

In addition, besides the auxiliary display units 12 or the display control circuit 13, the coordination sub-area 1122 may further be reserved with a process coordination place so as to implement an assembly process between the lighting functional module 21 and the screen 1.

The distribution relationship between the lighting sub-area 1121 and the coordination sub-area 1122 in the lighting functional coordination area 112 will be hereinafter described as an example.

In an embodiment, as shown in FIGS. 1-3, the lighting functional coordination area 112 includes one lighting sub-area 1121, and the coordination sub-area 1122 is disposed at an edge of the lighting functional coordination area 112. By arranging one lighting sub-area 1121 in the lighting functional coordination area 112, the structural distribution of the lighting functional coordination area 112 can be simplified, and the convenience in machining and manufacture can be improved; and on the other hand, under a condition in which the area of the lighting functional coordination area 112 is fixed, the individual arrangement of the lighting sub-area 1121 for the lighting functional coordination area 112 can increase the continuous area of the lighting sub-area 1121, and the difficult for implementation of the lighting function can be lowered when a lighting probe 211 of the lighting functional module 21 is coordinated with the lighting sub-area 1121.

In such a case, by arranging the coordination sub-area 1122 at the edge of the lighting functional coordination area 112, the space occupied by the lighting sub-area 1121 in the coordination sub-area 1122 can be reduced, the relevance between an auxiliary coordination unit of the coordination sub-area 1122 and the main display area 111 can be increased, and the overall display effect of the screen 1 can be improved. Particularly, when the display control circuit 13 is disposed in the main display area 111, the arrangement of the coordination sub-area 1122 at the edge of the lighting functional coordination area 112 is also convenient to implement the electrical connection between the display control circuit 13 and the auxiliary display units 12.

In the above embodiment, the auxiliary display units 12 can be uniformly distributed in the coordination sub-area 1122, or can be intensively distributed at a preset position of the coordination sub-area 1122 in part or whole, and the distribution manner of the auxiliary display units 12 is not defined by the present disclosure. When the auxiliary display units 12 are uniformly distributed in the coordination sub-area 1122, the convenience for arrangement and control of the auxiliary display units 12 can be improved. When the auxiliary display units 12 are intensively distributed at a preset position of the coordination sub-area 1122 in part or whole, the display effect of the coordination sub-area 1122 can be controlled specifically, and the cooperative display effect of the coordination sub-area 1122 and the main display area 111 can be improved.

Further, the coordination sub-area 1122 may surround the lighting sub-area 1121, for the ease of bringing an enclosure effect of the auxiliary display units 12 in the coordination sub-area 1122 to the lighting sub-area 1121; and therefore, the auxiliary display units 12 can implement a transitional display effect with the main display area 111 at the periphery of the lighting sub-area 1121, and the overall display effect of the screen 1 can be improved.

Figure 4:
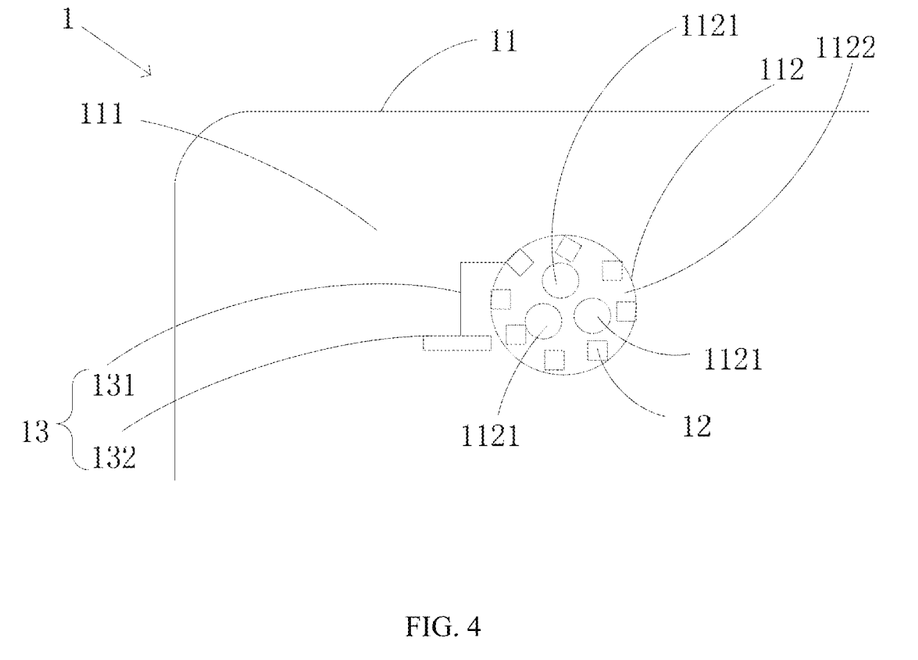
FIG. 4 is a schematic diagram of a locally-enlarged structure of a screen in a still another exemplary embodiment of the present disclosure.

In another embodiment, as shown in FIG. 4, the lighting functional coordination area 112 includes multiple lighting sub-areas 1121. Under a condition in which the area of the lighting functional coordination area 112 is fixed, the arrangement of the multiple lighting sub-areas 1121 for the lighting functional coordination area 112 can reduce the area of each single lighting sub-area 1121. As the lighting sub-areas 1121 do not have the display function, the decrease in the areas of the lighting sub-areas 1121 can reduce the influence from the lighting sub-areas 1121 to the overall display effect of the screen 1. The lighting probe 211 of the lighting functional module 21 can implement the lighting function through the multiple lighting sub-areas 1121, which also enriches the lighting manner of the lighting functional module 21.

The coordination sub-area 1122 can be disposed at the edge of the lighting functional coordination area 112, so that the space occupied by the lighting sub-areas 1121 in the coordination sub-area 1122 can be reduced, the relevance between an auxiliary coordination unit of the coordination sub-area 1122 and the main display area 111 can be increased, and the overall display effect of the screen 1 can be improved. Particularly, when the display control circuit 13 is disposed in the main display area 111, the arrangement of the coordination sub-area 1122 at the edge of the lighting functional coordination area 112 is also convenient to implement the electrical connection between the display control circuit 13 and the auxiliary display units 12.

Figure 5:
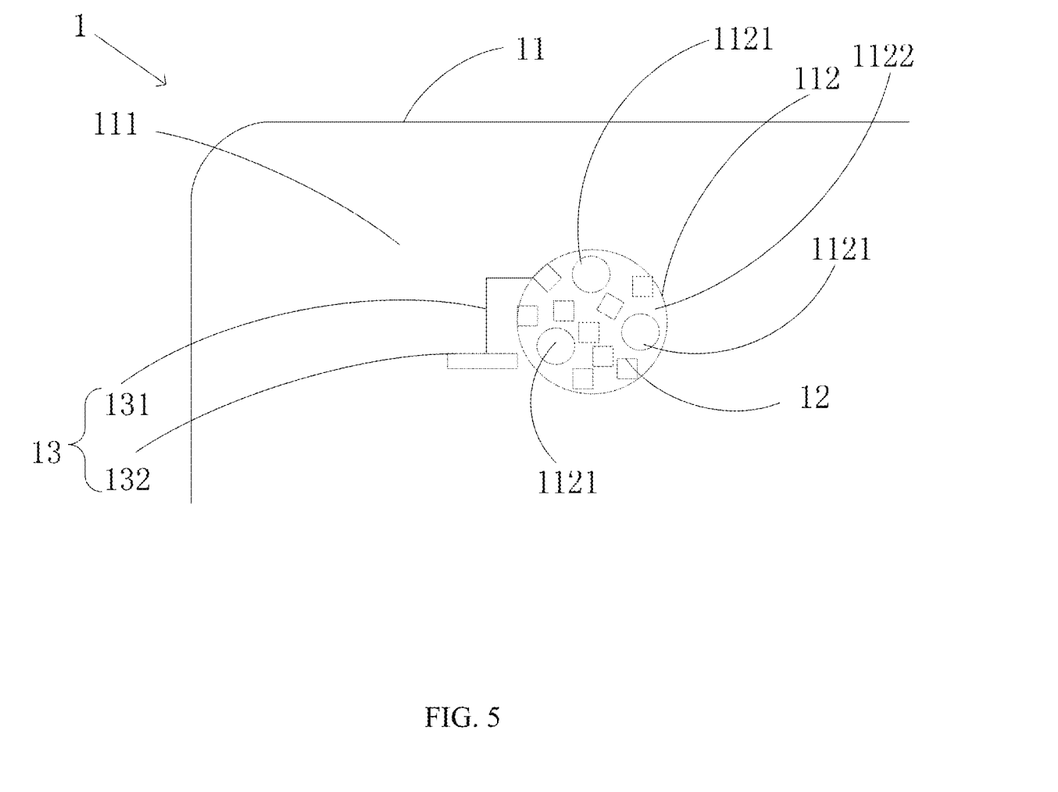
FIG. 5 is a schematic diagram of a locally-enlarged structure of a screen in a further still another exemplary embodiment of the present disclosure.

Alternatively, a gap can be formed between the multiple lighting sub-areas 1121, and the coordination sub-area 1122 may keep away from the lighting sub-areas 1121 and penetrate into the gap. The lighting sub-areas 1121 are a non-display area and the auxiliary display units 12 are disposed in the coordination sub-area 1122, therefore, the display function can be implemented under the coordination between the coordination sub-area 1122 and the main display area 111. The coordination sub-area 1122 having the display function may penetrate into the non-display area, so that the display relevance effect of the lighting functional sub-area and the main display area 111 can further be increased, and the overall display effect of the screen 1 can be improved. Further, as shown in FIG. 5, the coordination sub-area 1122 is disposed both in the gap between the lighting sub-areas 1121 and at the edge of the lighting functional coordination area 112, so as to increase the area for arranging the auxiliary display units 12 and improve the cooperative effect between the auxiliary display units 12 and the main display area 111.

In the above embodiment, the auxiliary display units 12 can be uniformly distributed in the coordination sub-area 1122, or can be intensively distributed at a preset position of the coordination sub-area 1122 in part or whole, and the distribution manner of the auxiliary display units 12 is not defined by the present disclosure. When the auxiliary display units 12 are uniformly distributed in the coordination sub-area 1122, the convenience for arrangement and control of the auxiliary display units 12 can be improved. When the auxiliary display units 12 are intensively distributed at a preset position of the coordination sub-area 1122 in part or whole, the display effect of the coordination sub-area 1122 can be controlled specifically, and the cooperative display effect of the coordination sub-area 1122 and the main display area 111 can be improved.

In the above embodiment, the light transmittance of the lighting sub-areas 1121 can be 100% so as to improve the lighting effect of the lighting functional module 21. Alternatively, the light transmittance of the lighting sub-areas 1121 may further be set according to a lighting demand of the lighting functional module 21, and the specific value of the light transmittance of the lighting sub-areas 1121 is not limited by the present disclosure. The light transmittance of the auxiliary display units 12 can be zero, that is, the auxiliary display units 12 are completely lightproof, so that the display effect of the auxiliary display units 12 can be equivalent to that of the main display area 111. Alternatively, the light transmittance of the auxiliary display units 12 can be any value in 0-100% to implement the transitional display effect between the main display area 111 and the lighting functional sub-area.

In addition, the size of the lighting functional coordination area 112 can be set according to the number, structure and size of the lighting functional module 21, and is not limited by the present disclosure. For example, the electronic device 2 is a mobile phone and the lighting functional module 21 is a front camera. In a case that the circular lighting functional coordination area 112 includes one circular lighting sub-area 1121, the diameter of the lighting functional coordination area 112 can be smaller than or equal to 3 mm, and the diameter of the lighting sub-area 1121 can be smaller than or equal to 1.5 mm, so that the overall display effect of the screen 1 can be improved on the premise of guaranteeing a front lighting function.

The present disclosure further provides an electronic device 2, which includes a lighting functional module 21 and the screen 1. The lighting functional module 21 can be correspondingly disposed under a lighting functional coordination area 112, and a lighting probe 211 of the lighting functional module 21 may correspond to a lighting sub-area 1121.

By dividing a lighting functional coordination area 112 of a main body display module 11 into a lighting sub-area 1121 and a coordination sub-area 1122 out of the lighting sub-area 1121, and arranging auxiliary display units 12 in the coordination sub-area 1122, the lighting effect of the lighting sub-area 1121 is no longer interfered by the peripheral auxiliary display units 12, and thus the lighting effect can be improved. In addition, the display effect of the auxiliary display units 12 disposed in the coordination sub-area 1122 in a working state can be matched with a display content of a main display area 111, so that the influence of the lighting functional coordination area 112 on the overall display effect of a screen 1 can be reduced. With the above structure, the lighting effect of the lighting functional module 21, the overall display effect of the screen 1, and the user experience in use of the screen 1 of an electronic device 2 can be improved.

It is to be noted that the lighting functional module 21 can be one of a front camera, a photo-sensor, or an auxiliary photographing module, which is not limited by the present disclosure thereto. In an example that the lighting functional module 21 is a front camera, the lighting probe 211 of the front camera is a lens.

Figure 6:
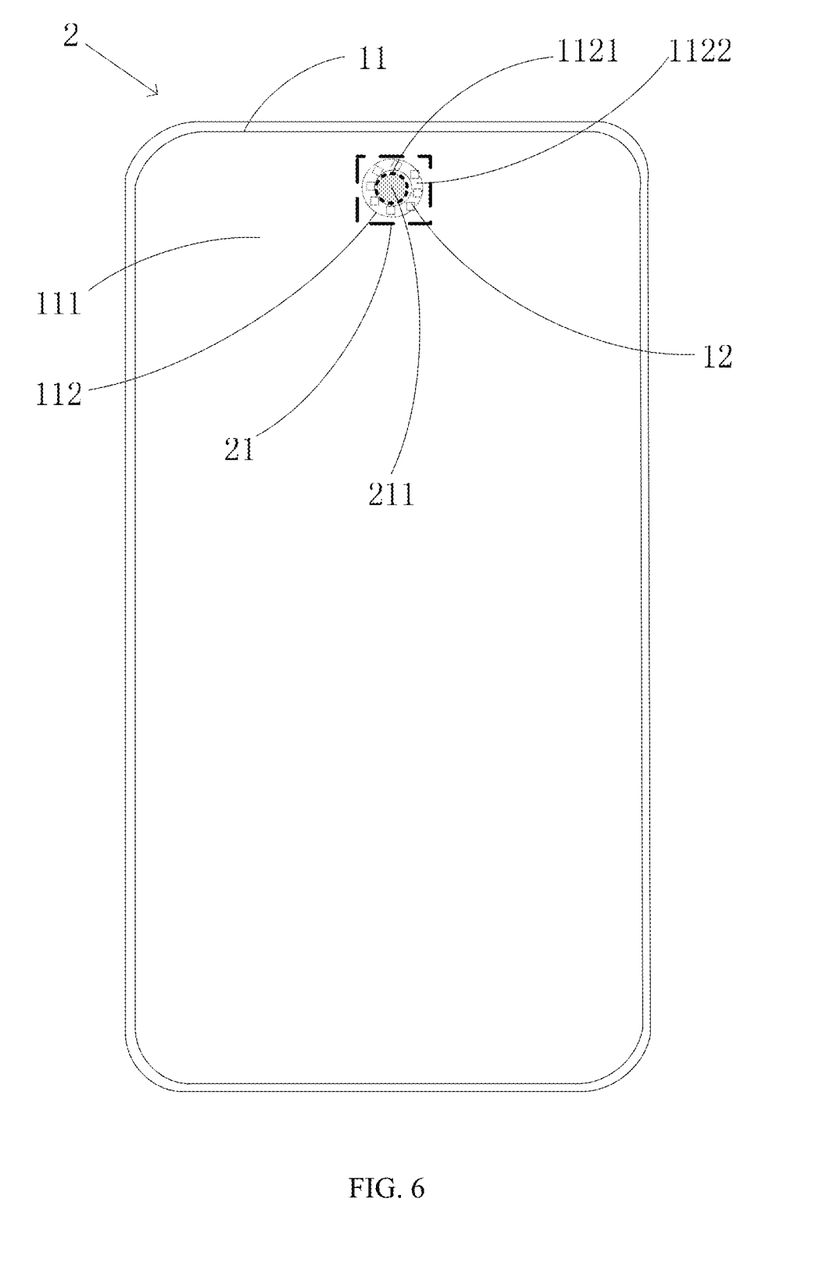
FIG. 6 is a structural schematic diagram of an electronic device according to some embodiments of the present disclosure.

In another embodiment, as shown in FIG. 6, the electronic device 2 includes a front camera, the lighting functional coordination area 112 includes a lighting sub-area 1121, and a lens of the front camera corresponds to the lighting sub-area 1121. With the arrangement of the single lighting sub-area 1121, the front lighting and photographing functions of the front camera can be guaranteed, and the overall structure of the electronic device 2 can be further simplified.

Figure 7:
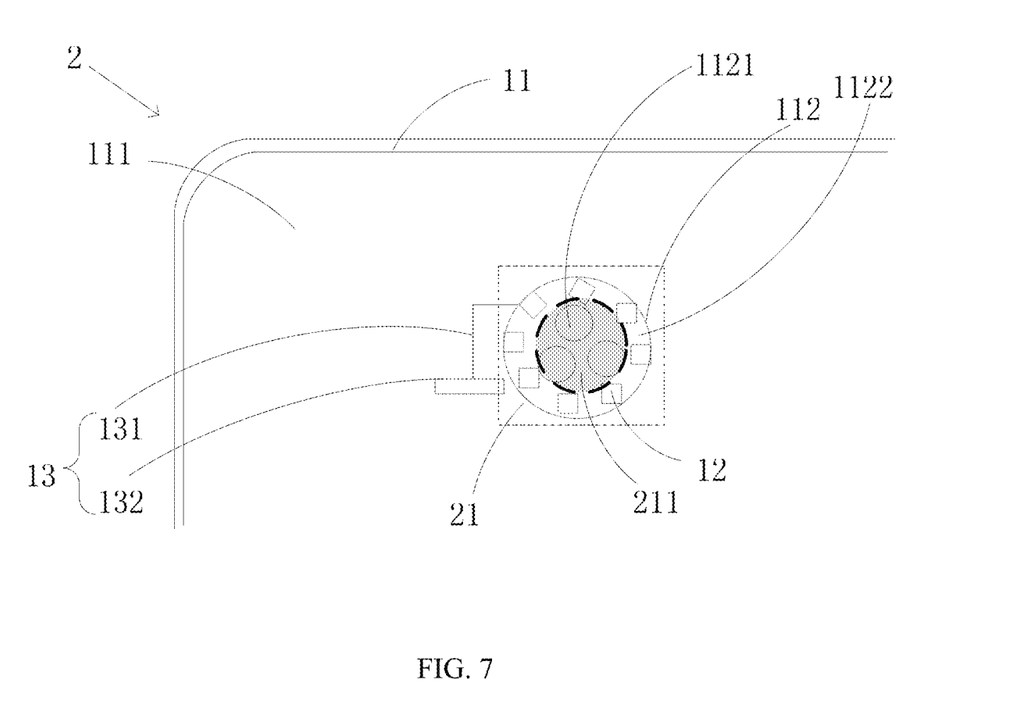
FIG. 7 is a schematic diagram of a locally-enlarged structure of an electronic device according to some embodiments of the present disclosure.

Alternatively, as shown in FIG. 7, the lighting functional coordination area 112 includes multiple lighting sub-areas 1121, the multiple lighting sub-areas 1121 are intensively distributed and form a comprehensive lighting area, and the lens of the front camera corresponds to the comprehensive lighting area. With the multiple lighting sub-areas 1121, the shooting vision of the front camera can be increased, and the shooting effect of the front camera is improved.

Figure 8:
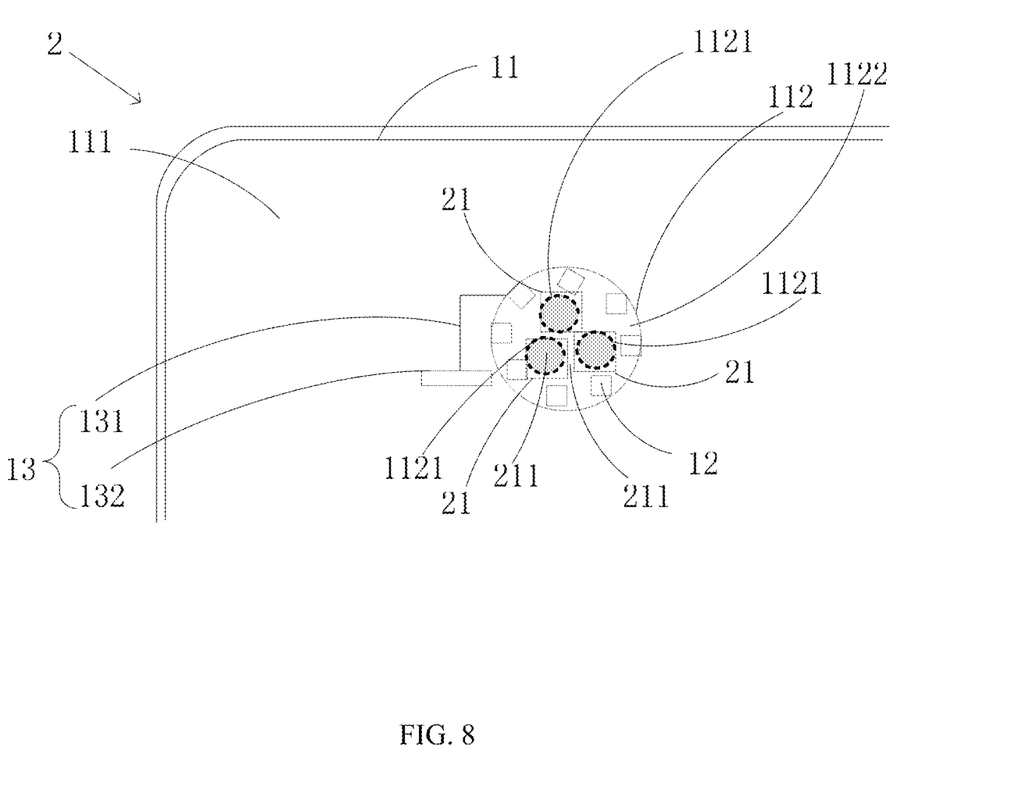
FIG. 8 is a schematic diagram of a locally-enlarged structure of an electronic device in another exemplary embodiment of the present disclosure.

In another embodiment, as shown in FIG. 8, the electronic device 2 includes multiple front cameras, the lighting functional coordination area 112 includes multiple lighting sub-areas 1121, and lenses of the multiple front cameras are in one-to-one correspondence with the multiple lighting sub-areas 1121. With the one-to-one coordination between the multiple front cameras and the multiple lighting sub-areas 1121, the front photographing function of the multiple cameras can be implemented; and by integrating photographed images of the multiple front cameras, the photographing effect of the front photographing function can be improved.

Additionally, multiple different lighting functional modules 21 such as the front camera, a photo-sensor and an auxiliary photographing module can be provided for the electronic device 2; the lighting functional coordination area 112 may include multiple lighting sub-areas 1121; and lighting probes 211 of the front camera, the photo-sensor and the auxiliary photographing module can be cooperated with the multiple lighting sub-areas 1121 in one-to-one correspondence, so that the front lighting function of the electronic device 2 is enriched.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "connected," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples,' and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer.

Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A mobile terminal comprising:
   a screen, comprising a main body display module and auxiliary display units,
      wherein the main body display module comprises a main display area and a lighting functional coordination area, and the lighting functional coordination area comprises a lighting sub-area and a coordination sub-area disposed out of the lighting sub-area; and
      the auxiliary display units are disposed in the coordination sub-area, and a display effect of the auxiliary display units in a working state is matched with a display content of the main display area of the main body display module; and
   a display control circuit, disposed in the main display area,
   wherein the coordination sub-area includes the auxiliary display units only, to thereby prevent interference from the display control circuit to the lighting sub-area, improve flexibility of arrangement of the auxiliary display units and cooperative display effect between the auxiliary display units and the main display area.

2. The mobile terminal of claim 1, further comprising a front camera disposed in the lighting sub-area.

3. The mobile terminal of claim 1, further comprising a display control circuit electrically connected to the auxiliary display units, wherein the display control circuit is disposed in the main display area.

4. The mobile terminal of claim 3, wherein the display control circuit comprises a series circuit connected to the auxiliary display units and a drive component for controlling the auxiliary display units.

5. The mobile terminal of claim 1, wherein the lighting functional coordination area comprises one lighting sub-area, and the coordination sub-area is disposed at an edge of the lighting functional coordination area.

6. The mobile terminal of claim 5, wherein the coordination sub-area surrounds the lighting sub-area.

7. The mobile terminal of claim 1, wherein the lighting functional coordination area comprises multiple lighting sub-areas, and the coordination sub-area is disposed at an edge of the lighting functional coordination area.

8. The mobile terminal of claim 1, wherein the lighting functional coordination area comprises multiple lighting sub-areas, a gap is formed between the multiple lighting sub-areas, and the coordination sub-area is disposed in the gap.

* * * * *